Figure 1:
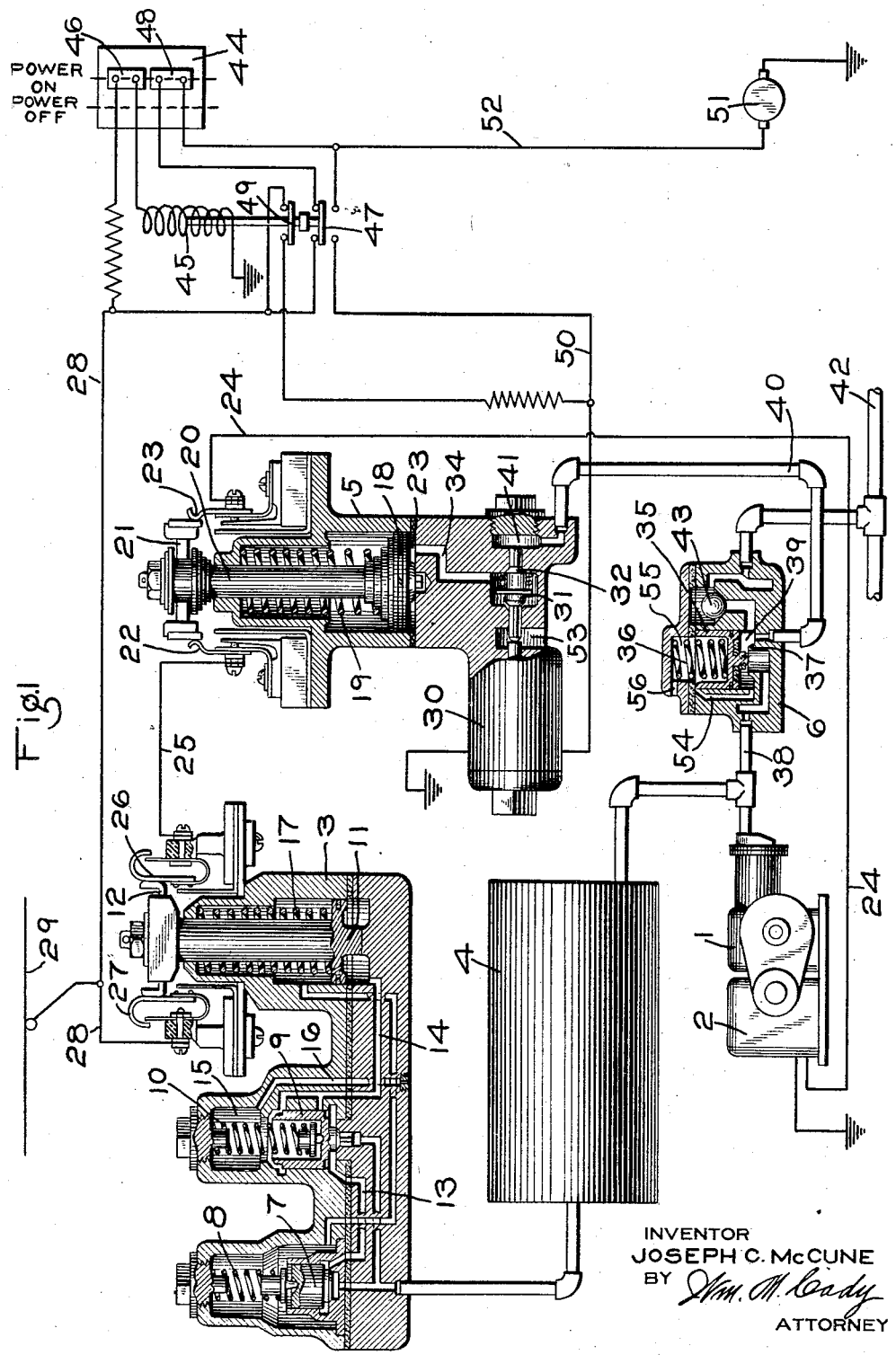

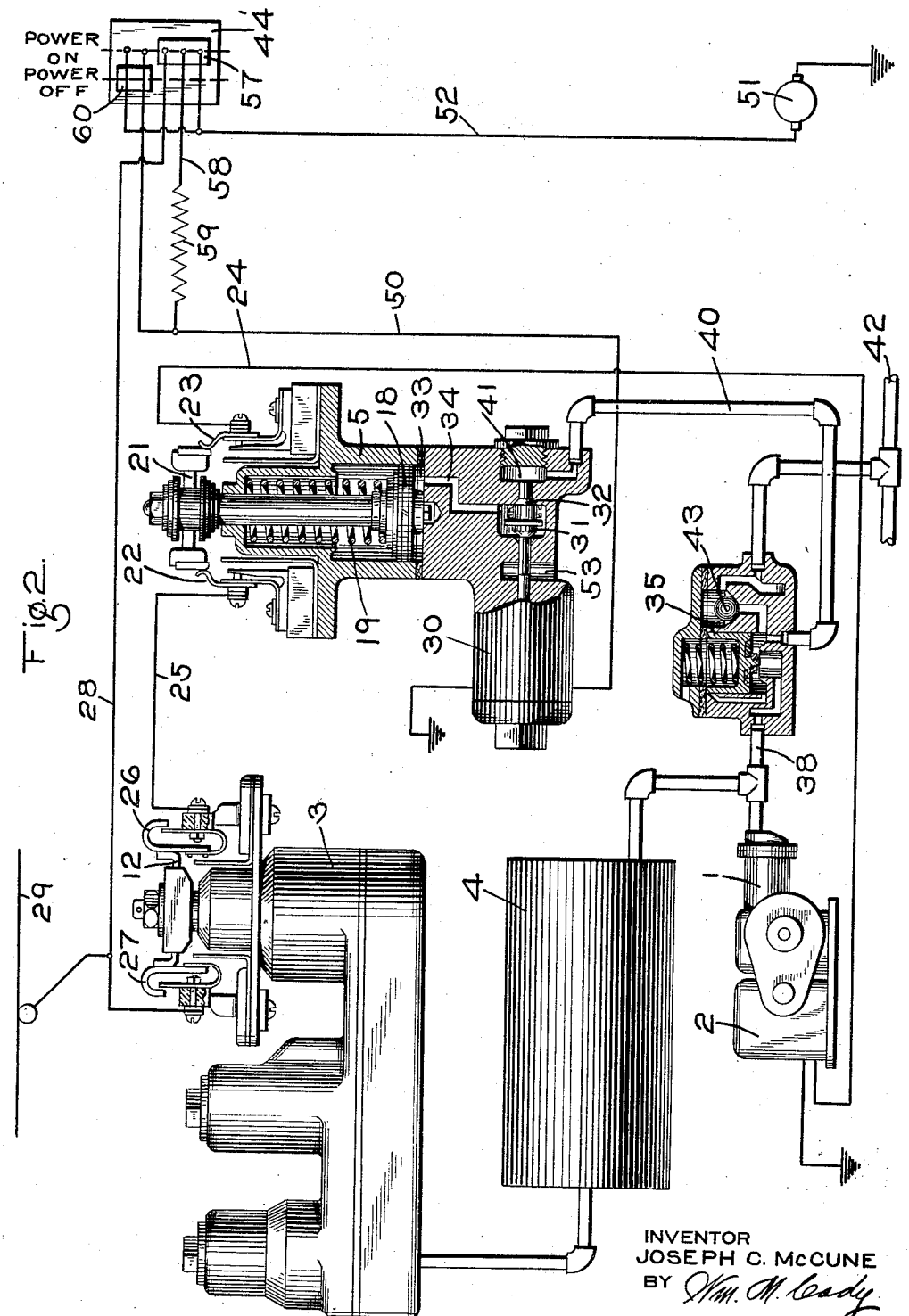

Patented May 19, 1931

1,805,629

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

COMPRESSOR CONTROL DEVICE

Application filed January 29, 1930. Serial No. 424,232.

This invention relates to apparatus employed on electric traction vehicles for compressing fluid for use in controlling the fluid pressure brakes.

On vehicles equipped with a fluid compressor, a governor device is provided which is adapted, upon a predetermined reduction in pressure in the main or storage reservoir, to effect the starting of the compressor. When the compressor is thus started, it continues to operate until the main reservoir pressure has been increased to a predetermined maximum degree, at which time the compressor governor operates to effect the stopping of the compressor.

It is often undesirable to have the compressor running while a vehicle is standing, since the running of the compressor is apt to be noisy to such an extent as to be disagreeable and annoying, and the principal object of my invention is to provide automatic means for preventing the compressor from operating while a vehicle is standing, or unless the main reservoir pressure has been reduced to a very low degree.

In the accompanying drawings; Fig. 1 is a diagrammatic view, with the principal devices in section, of a fluid compressing apparatus embodying my invention; and Fig. 2 is a diagrammatic view of a fluid compressing apparatus embodying a slightly modified form of my invention.

As shown in Fig. 1, the apparatus may comprise a fluid compressor 1, adapted to be driven by an electric motor 2, an electric compressor governor 3, a main or storage reservoir 4, a switch controlling device 5 for controlling the circuit of the compressor motor 2, and a main reservoir cut-off valve device 6.

Any desired type of compressor governor may be employed, the governor shown in the drawings being of the type comprising a cut out valve 7, subject on one side to the pressure of spring 8 and on the opposite side to the pressure of fluid in the main reservoir 4, a cut-in valve 9 subject on one side to the pressure of spring 10, and a switch piston 11, adapted to operate a switch contact member 12 for controlling the opening and closing of the circuit of the compressor motor 2.

When, by the running of the compressor 1, the main reservoir pressure has been increased sufficiently to overcome the tension of spring 8, the valve 7 lifts from its seat, so that fluid under pressure is supplied through passage 13 to the under face of valve 9. The valve 9 is then lifted from its seat against the tension of spring 10, so that fluid under pressure is supplied through passage 14 to the under face of piston 11. The piston 11 then moves outwardly, causing the switch member 12 to move so as to open the compressor motor circuit.

When the main reservoir pressure acting on the under face of valve 9 has been reduced slightly below the tension of spring 10, the valve 9 will move to its lower seat, in which the chamber at the under face of piston 11 is connected to the atmosphere through passage 14 and chamber 15, which is open to the atmosphere through passage 16.

The switch piston 11 is then moved downwardly by spring 17, so that the switch contact member 12 is operated to close the circuit of the compressor motor 2.

The switch controlling device 5 comprises a piston 18, subject on one side to the pressure of a coil spring 19 and having a piston stem 20 for operating a switch contact member 21. The contact member 21 is associated with fixed contacts 22 and 23, the contact 23 being connected to wire 24, leading to the compressor motor 2 and contact 22 being connected by wire 25 with the fixed contact 26 of the switch member 12, the other fixed contact 27 of which is connected to wire 28 which receives current from the trolley wire 29.

Associated with the switch device 5 in an electro-magnet 30 adapted to control the operation of double beat valves 31 and 32, for controlling the admission and release of fluid under pressure through passage 34 to chamber 33 at the lower face of piston 18.

The main reservoir cut-off valve device 6 comprises a valve piston 35, subject on one side to the pressure of a coil spring 36 tending to urge the valve piston into engagement with a seat ring 37. The area within the seat ring 37 is connected by pipe 38 to the main reservoir 4 and the compressor 1, and the chamber 39 at the lower face of the valve piston is connected to a pipe 40, leading to a chamber 41 in the switch controlling device 5. The chamber 39 is also connected through pipe 42 with the usual main reservoir pipe line 42, a check valve 43 preventing back flow from pipe 42 to chamber 39.

In the power on positions of the usual power controller drum 44, a solenoid 45 is energized by current supplied from the wire 28, through a contact 46 on the controller drum and the solenoid 45 when energized, a line switch contact member 47 closes the line circuit to the controller, through a contact 48 on the controller drum.

The above is the usual line switch controlling means and according to my invention, an additional switch contact member 49 is employed. When the solenoid 45 is energized, the contact member 49 closes a circuit from wire 28 to wire 50 leading to magnet 30, so that the magnet 30 is energized in the power on positions of the controller.

When the solenoid 45 is deenergized, in the power off position of the controller, the contact member 47 is adapted to close a circuit from the car motor 51, from wire 52 to wire 50, so that in the power off position, the magnet 30 is controlled by the counter E. M. F. of the car motors.

In operation, the controller in a power on position as shown in the drawing, the solenoid 45 is energized so as to hold the line switch contact 47 closed and also the contact 49 is held in closed position, so that magnet 30 is energized. With magnet 30 energized, the valve 32 will be held seated, while valve 31 is unseated, so that passage 34 is open to the atmospheric exhaust port 53. The piston chamber 33 thus being at atmospheric pressure, the piston 18 is held in its lower position, in which the contact member 21 closes the circuit from wire 25 to wire 24.

The usual pump governor 3 now controls the operation of the compressor motor 2, so that when the pressure of fluid compressed by the compressor 1 has been increased to a predetermined degree, the pump governor operates to move the switch contact member 12 so as to open the compressor motor circuit. When the pressure of fluid in the main reservoir 4 has been reduced to a predetermined degree, the pump governor 3 operates to move the switch contact member 12 to close the compressor motor circuit.

When the power controller is moved to off position, however, the solenoid 45 operates to shift the switch contacts 47 and 49, so that the contact 47 closes a circuit from the car motor 51 to the magnet 30. If the speed of the vehicle is above a predetermined low degree, the counter E. M. F. is sufficient to energize the magnet 30, so that the valves 31 and 32 remain in the positions shown, the same as when the magnet is energized by current supplied in the power on positions. As a result, the piston 18 is maintained in its lower position, and the contact member 21 remains in the position closing the compressor motor circuit. Thus, so long as the magnet 30 is maintained energized by the counter E. M. F. of the car motor, the pump governor 3 is permitted to control the operation of the compressor motor 2.

When the vehicle has been brought to a stop or nearly so, the counter E. M. F. is not sufficient to energize the magnet 30 and consequently, the magnet being deenergized, the valve 31 is permitted to move to its seat, while valve 32 is unseated, so that fluid under pressure is supplied from chamber 41 through passage 34 to piston chamber 33. The piston 18 is then shifted upwardly, so that the contact member 21 is operated to open the compressor motor circuit. As a consequence, when the vehicle is at a stop, the compressor will not run, even though the pressure of fluid in the main reservoir 4 be below the setting of the compressor governor 3.

The valve piston 35 of the main reservoir cut-off valve device 6 is normally held in its upper position, as shown in the drawings, by fluid at main reservoir pressure acting in chamber 39. If, however, the main reservoir pressure should fall to a low degree, then the valve piston 35 will be moved downwardly by spring 36, to its seat ring 37. In this position, the chamber 39 is connected, through passage 54, with the spring chamber 55, which is open to the atmosphere through port 56. As a consequence, fluid under pressure is vented from said chamber and from pipe 40 and chamber 41. Fluid being thus vented from piston chamber 33, the piston 18 is shifted downwardly by spring 19, so as to cause the contact member 21 to close the compressor motor circuit.

The main reservoir pressure being below the setting of the pump governor 3, the switch contact 12 of the governor will be in its closed position, so that current is supplied to the compressor motor 2 to cause the running of the compressor 1.

It will thus be seen that even when the vehicle is standing, should the main reservoir pressure fall to a dangerously low degree, the compressor will be started, so as to pump up the pressure in the main reservoir.

Where a relay line switch controlling means is not available, the control of the circuit of magnet 30 may be effected through contacts on the drum of the controller, as shown in Fig. 2. The apparatus shown in Fig. 2 is the same as that shown in Fig. 1, but in the Fig. 2 construction, when the controller drum is in a power on position, a contact 57 connects the current wire 28 with wire 50, through a wire 58, having a resistance unit 59 therein.

In the power off position, a contact 60 on the drum connects the motor wire 52 with wire 50, so that the magnet 30 is energized in the power off position, by the counter E. M. F. of the motor, as in the construction shown in Fig. 1.

The operation, as will be evident, is the same as that of the Fig. 1 construction, except that the circuit connections for the magnet 30 are effected through contacts on the controller drum instead of by operation of the relay line switch controlling means.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a vehicle carried fluid compressor, an electric motor for driving said compressor, and a governor controlled by variations in the pressure of fluid compressed by the compressor for controlling the motor circuit, of an electric motor for driving the vehicle, electrically controlled means for also controlling the compressor motor circuit, and means for energizing said electrically controlled means by the counter electro-motive force of the vehicle motor.

2. The combination with a vehicle carried fluid compressor, an electric motor for driving said compressor, and a governor controlled by variations in the pressure of fluid compressed by the compressor for controlling the motor circuit, of a power controller, means for energizing said electrically controlled means in a power on position of the controller, an electric motor for driving the vehicle, and means for energizing said electrically controlled means by the counter electromotive force of the vehicle motor.

3. The combination with a vehicle carried fluid compressor, an electric motor for driving said compressor, and a governor controlled by variations in the pressure of fluid compressed by the compressor for controlling the motor circuit, of a power controller, means for energizing said electrically controlled means in a power on position of the controller, an electric motor for driving the vehicle, and means for energizing said electrically controlled means by the counter electromotive force of the vehicle motor in the power off position of the controller.

4. The combination with a vehicle carried fluid compressor, an electric motor for driving said compressor, and a reservoir into which said compressor compresses fluid, of a switch for opening and closing the motor circuit, means for operating said switch, and a valve device operated upon a predetermined reduction in fluid pressure in said reservoir for effecting the operation of said means to close said switch.

5. The combination with a vehicle carried fluid compressor, an electric motor for driving said compressor, and a reservoir into which said compressor compresses fluid, of a switch device operated upon bringing the vehicle to a stop for opening the motor circuit, and a valve device operated upon a predetermined reduction in fluid pressure in said reservoir for operating said switch device to close the motor circuit.

6. The combination with a vehicle carried fluid compressor, an electric motor for driving said compressor, and a reservoir into which said compressor compresses fluid, of a switch device for opening and closing the motor circuit, means operated upon stopping the vehicle for operating said switch device to open the motor circuit, and a valve device operated upon a predetermined reduction in fluid pressure in said reservoir for operating said switch device to close the motor circuit.

7. The combination with a vehicle carried fluid compressor, an electric motor for driving said compressor, and a reservoir into which said compressor compresses fluid, of a fluid pressure operated switch device for opening and closing the motor circuit, valve means for controlling the fluid pressure for operating said switch device, electrically controlled means for operating said valve means, and means for energizing said electrically controlled means while the vehicle is running and for deenergizing said electrically controlled means when the vehicle is stopped.

8. The combination with a vehicle carried fluid compressor, an electric motor for driving said compressor, and a reservoir into which said compressor compresses fluid, of a fluid pressure operated switch device for opening and closing the motor circuit, valve means for controlling the fluid pressure for operating said switch device, electrically controlled means for operating said valve means, means operative when the vehicle is brought to a stop for deenergizing said electrically controlled means to operate said valve means and thereby effect the movement of said switch device to open the motor circuit, and a valve device operated upon a predetermined reduction in fluid pressure in said reservoir for varying the fluid pressure on said switch device to effect the movement of said switch device so as to close the motor circuit.

9. The combination with a vehicle carried fluid compressor, an electric motor for driving said compressor, and a compressor governor including a switch for controlling the motor circuit, said governor being operated by variations in the pressure of fluid compressed by the compressor for opening and closing said switch, of an additional switch in series with the compressor switch in the motor circuit, and means for opening said additional switch when the vehicle is brought to a stop.

10. The combination with a vehicle carried fluid compressor, an electric motor for driving said compressor, and a compressor governor including a switch for controlling the motor circuit, said governor being operated by variations in the pressure of fluid compressed by the compressor for opening and closing said switch, of an additional switch in series with the compressor switch in the motor circuit, means for opening said switch when the vehicle is brought to a stop, and means for closing said switch when the pressure of fluid compressed by the compressor is reduced to a predetermined degree.

11. The combination with a vehicle carried fluid compressor, an electric motor for driving said compressor, and a compressor governor including a switch for controlling the motor circuit, said governor being operated by variations in the pressure of fluid compresed by the compressor for opening and closing said switch, of an additional switch in series with the compressor switch in the motor circuit, means for closing said additional switch while the vehicle is running and for opening said switch when the vehicle is brought to a stop, and means for closing said additional switch upon a reduction in the pressure of fluid compressed by the compressor to a predetermined degree.

In testimony whereof I have hereunto set my hand, this 27th day of January, 1930.

JOSEPH C. McCUNE.